United States Patent
Whaley et al.

(10) Patent No.: US 12,437,653 B2
(45) Date of Patent: Oct. 7, 2025

(54) SYSTEM AND METHOD FOR SPEECH-ENABLED ADAPTIVE TRAINING FOR HUMAN PILOT VERBAL DATA CAPTURE AND REPORTING FOR FLIGHT OPERATIONS QUALITY ASSURANCE

(71) Applicant: OnStation LLC, Los Angeles, CA (US)

(72) Inventors: Lewis A. Whaley, Charleston, WV (US); Mark R. Jean, Palmdale, CA (US)

(73) Assignee: OnStation LLC, Los Angeles, CA (US)

( * ) Notice: Subject to any disclaimer, the term of this patent is extended or adjusted under 35 U.S.C. 154(b) by 0 days.

(21) Appl. No.: 18/967,472

(22) Filed: Dec. 3, 2024

(65) Prior Publication Data
US 2025/0182627 A1    Jun. 5, 2025

Related U.S. Application Data

(60) Provisional application No. 63/605,674, filed on Dec. 4, 2023.

(51) Int. Cl.
*G08G 5/24*    (2025.01)
*B64C 13/18*    (2006.01)
(Continued)

(52) U.S. Cl.
CPC .............. *G08G 5/24* (2025.01); *B64C 13/18* (2013.01); *G06F 40/279* (2020.01); *G10L 15/22* (2013.01)

(58) Field of Classification Search
None
See application file for complete search history.

(56) References Cited

U.S. PATENT DOCUMENTS 9,227,736 B2    1/2016    Whitlow et al.
9,511,877 B2    12/2016   Masson
(Continued)

OTHER PUBLICATIONS

U.S. Department of Transportation, Flight Operational Quality Assurance, AC No. 120-82, published Apr. 12, 2004 https://www.faa.gov/regulations_policies/advisory_circulars/index.cfm/go/document.information/documentid/23227.

(Continued)

*Primary Examiner* — Jonathan C Kim
(74) *Attorney, Agent, or Firm* — Concourse Law Group; Katherine B. Sales, Esq.

(57) ABSTRACT

A system and method for implementing one or more real-time flight operations quality assurance (RTS-FOQA) systems and protocols is disclosed. RTS-FOQA systems assist pilots and other personnel in managing hazards and risks to protect the safety of passengers, pilots, flight attendants, crew, as well as people on the ground. The system is configured to capture voice data from the cockpit, recognize words spoken by the pilots, air traffic controllers (ATC), and other personnel; convert the recognized words into text; compare the text derived from the words spoken by the pilots, ATC, and other personnel to a standard operational procedure (SOP) sequence, wherein the sequence comprises a plurality of SOP operational steps; identify at least one of a plurality of flight operations executed by the pilots; compare the plurality of flight operations executed by the pilots with the required SOP operational procedures; identify at least one of the plurality of SOP operational steps not executed or incorrectly executed by the pilots; and alert the pilots if and when the pilots fails to execute or incorrectly execute any of the plurality of SOP operational steps. In addition to alerting the pilots of the deviation(s) from the SOP sequence(s), the system may automatically generate a SOP exceedance report for recording the SOP operational (Continued)

step(s) not executed or incorrectly executed by the pilot(s), as well as automatically execute an emergency response, automatically execute an evasive maneuver, and/or automatically implement an autopilot—E.G., initiate execution of remotely-piloted, semi-autonomous, or autonomous, arrival approach, and landing procedures.

18 Claims, 3 Drawing Sheets

(51) Int. Cl.
*G06F 40/279* (2020.01)
*G10L 15/22* (2006.01)

(56) References Cited

U.S. PATENT DOCUMENTS

| | | | |
|---|---|---|---|
| 10,373,404 B2 | 8/2019 | Curtis | |
| 10,642,270 B2 | 5/2020 | Duda et al. | |
| 10,643,480 B2 | 5/2020 | Sherry et al. | |
| 2011/0054721 A1* | 3/2011 | Goodrich | G05B 23/0283 701/14 |
| 2012/0290154 A1* | 11/2012 | Lopez Leones | G08G 5/21 701/3 |
| 2013/0317670 A1* | 11/2013 | Magana Casado | B64C 19/00 701/3 |
| 2016/0002733 A1 | 1/2016 | Towers et al. | |
| 2016/0176538 A1* | 6/2016 | Bekanich | G08G 5/21 701/14 |
| 2017/0039858 A1* | 2/2017 | Wang | G10L 15/08 |
| 2017/0336631 A1 | 11/2017 | Armstrong | |
| 2018/0017971 A1 | 1/2018 | Di Cairano et al. | |
| 2018/0047294 A1 | 2/2018 | Esposito | |
| 2019/0235488 A1 | 8/2019 | Beth et al. | |
| 2019/0367177 A1* | 12/2019 | Pena | G08G 5/21 |
| 2020/0130866 A1 | 4/2020 | Srinivasan | |
| 2020/0283165 A1* | 9/2020 | Krishnamoorthy | B64D 45/00 |
| 2020/0285996 A1* | 9/2020 | Janakiraman | G06N 7/01 |
| 2021/0024224 A1* | 1/2021 | Mohan | G07C 5/0808 |
| 2021/0350162 A1 | 11/2021 | Miller et al. | |
| 2021/0402942 A1* | 12/2021 | Torabi | G06N 3/02 |
| 2022/0126878 A1 | 4/2022 | Moustafa et al. | |
| 2023/0215431 A1 | 7/2023 | Baladhandapani et al. | |
| 2023/0409054 A1 | 12/2023 | Bradley | |

OTHER PUBLICATIONS

Chip Wright, "Airline safety today is something we all tend to take for granted, but it hasn't been an easy road to get where we are. The industry has done a remarkable job of learning lessons from accidents and making design and procedural changes to minimize future risk." Aircraft Owners and Pilots Association, published Jun. 3, 2022 https://www.aopa.org/news-and-media/all-news/2022/june/flight-training-magazine/foqa.

International Search Report and Written Opinion in PCT App. No. PCT/US2024/058294, dated Feb. 3, 2025.

* cited by examiner

SYSTEM AND METHOD FOR SPEECH-ENABLED ADAPTIVE TRAINING FOR HUMAN PILOT VERBAL DATA CAPTURE AND REPORTING FOR FLIGHT OPERATIONS QUALITY ASSURANCE

CROSS-REFERENCE TO RELATED APPLICATION(S)

This application claims the benefit of U.S. Provisional Patent Application Ser. No. 63/605,674 filed Dec. 4, 2023, titled "System and method for speech-enabled adaptive training for human pilot verbal data capture and reporting for flight operations quality assurance," which is hereby incorporated by reference herein for all purposes.

TECHNICAL FIELD

The invention generally relates to a real-time or near real-time flight operations quality assurance (FOQA) technique for increasing pilot situational awareness (SA) and for assisting pilots to comply with standard operational procedures (SOP) protocols. In particular, the system and method are configured to monitor the speech and actions of the pilots, notifying the pilots when they fail to comply with SOPs, and automatically taking remedial measures when necessary.

BACKGROUND

Flying aircraft involves a degree of inherent danger. To minimize this danger, aircraft manufacturers and the Federal Aviation Administration have developed extensive procedures and protocols setting forth the best practices for operating those aircraft. Pilots are then trained to execute any number of these procedures during all phases of flight operations. While the procedures have surely saved countless lives, the procedures are only as effective as the pilots' actions and communications while executing them. On occasion, pilots forget the procedures and verbal callouts, or execute them incorrectly, which places people on the aircraft and on the ground at risk. There is therefore a need for a real-time flight operations approach that ensures that the SOP protocols are correctly completed in a manner appropriate for the current situation, hazards, and risks at all times.

SUMMARY

This invention in the preferred embodiment features a novel real-time, speech-enabled flight operations quality assurance (RTS-FOQA) system. The RTS-FOQA system may comprise a microphone; a speaker; an exceedance alert display; and an artificial intelligence/machine learning (AI/ML) model configured to: receive cockpit voice data via the microphone; identify a plurality of flight operations executed by a pilot based on the cockpit voice data; identify a safety procedure (e.g., an SOP) based on the one or more identified operations, wherein the safety procedure comprises a plurality of operational steps; determine if the pilot fails to initiate or fails to correctly execute any of the plurality of operational steps; alert the pilot via the speaker and the exceedance alert display if and when the pilot fails to correctly complete any of the plurality of operational steps.

In some embodiments, the safety procedure-a standard operational procedure (SOP)—comprises both normal SOP protocols/sequences comprising pluralities of normal SOP operational steps, and emergency SOP protocols/sequences comprising pluralities of emergency SOP operational steps. As an example, an SOP sequence may prescribe the operational steps necessary to safely take off from an airport, fly at a particular altitude, avoid colliding with other aircraft in the vicinity, land an aircraft, taxi at an airport, or correctly address an "engine fire light" inflight.

In some embodiments, the RTS-FOQA system further comprises a natural language processor configured to recognize words spoken by the pilot and convert the recognized words into text; and a keyword matching processor configured to compare the text derived from the words spoken by the pilot to the SOP sequence; identify at least one of the plurality of flight operations executed by the pilot; identify at least one of the plurality of SOP operational steps not executed by the pilot; and alert the pilot if and when the pilot fails to implement any of the plurality of SOP operational steps. In some scenarios, the keyword matching processor may even select the SOP sequence from a plurality of SOPs encoded in the AI/ML model based on the text derived from the words spoken by the pilot.

In some embodiments, the SOP procedures comprising the RTS-FOQA system are kept in synch with the airline or other cognizant organization's SOPs via an application lifecycle management (ALM) system that incorporates an update/change management system that meets or exceeds the SOP update/change process system requirements for the pilots and other personnel. In other words, the AI/ML SOP system is kept in sync with the pilot's SOP system.

In addition to alerting the pilot when the person has failed to correctly execute an SOP operational step, the system may comprise a recommendation module configured identify one or more redial measures to execute if and when the pilot fails to implement any of the plurality of SOP operational steps. The set of one or more remedial measures may include, but is not limited to, the following: generating a record in an SOP discrepancy report, the record identifying the SOP operational step not executed by the pilot; automatically executing an emergency response; automatically executing an evasive maneuver; and automatically implementing an autopilot—E.G., initiate execution of remotely-piloted, semi-autonomous, or autonomous, arrival approach, and landing procedures.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
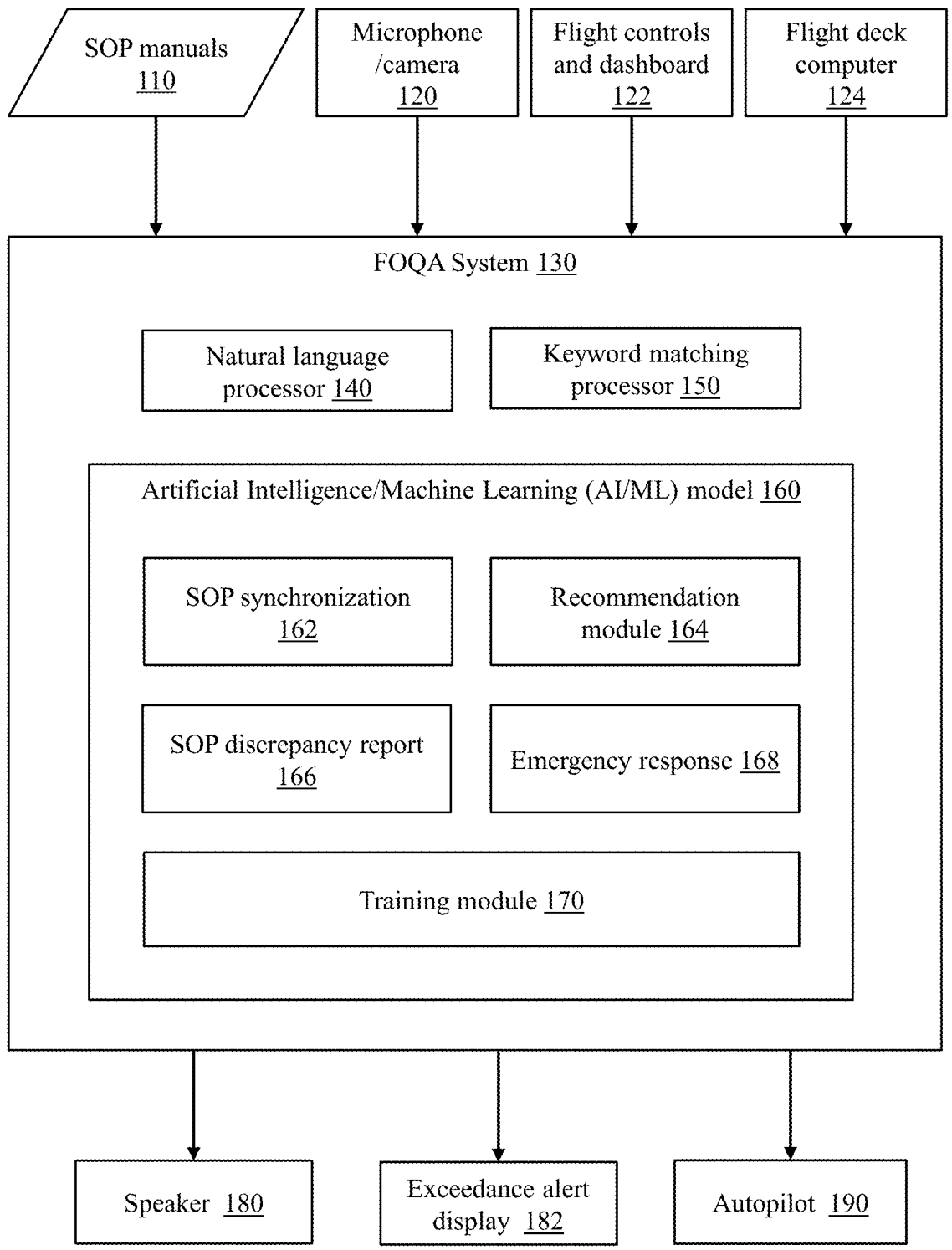
FIG. 1 is a functional block diagram of a system for implementing speech-enabled adaptive courseware and flight operations quality assurance, in accordance with a preferred embodiment of the present invention.

Illustrated in FIG. 1 is a functional block diagram of a system for implementing real-time speech-enabled adaptive courseware and flight operations quality assurance (RTS-FOQA), in accordance with a preferred embodiment of the present invention. The RTS-FOQA system 130 is configured to receive a plurality of digital manuals 110 detailing standard operational procedures (SOPs), Pilot's Operating Handbook (POH), Aircraft Flight Manual (AFM) and other required manuals, and other operations and reference documents (herein called "SOPs") for operating an aircraft or other vehicle, for example. Collectively, these operations and reference documents (SOPs) provide step-by-step instructions and additional information for how and when to carry out steps, tasks, techniques, or procedures. An airline or the military, for example, provides SOPs and other documents to support pilots in operating an aircraft safely and consistently in the course of normal, emergency, and non-standard operations. When used properly, SOPs and other aircraft operations and reference manuals ensure that tasks, techniques, and/or procedural operations are consistently completed correctly and in a specified order independent of the person executing the procedures.

In addition to digital manuals 110, the RTS-FOQA system 130 is configured to collect input data from the cockpit. This input data includes audio data received from a cockpit microphone 120, video data from a cockpit camera, control settings from flight control sensors and dashboard gauges/toggles/indicators 122, data from a flight deck computer (a.k.a. flight management system) 124 and/or other system inputs from one or more other systems used to collect data from an aircraft and/or cockpit, cabin-including data received from aircraft black-box and FOQA data—as well as from anywhere else a personnel may implement or practice SOP and/or other documented procedures.

The RTS-FOQA system 130 in the preferred embodiment includes a microphone 120 and/or camera, speaker 180, exceedance alert display 182, natural language processor 140, keyword matching processor 150, and artificial intelligence/machine learning (AI/ML) model 160. The ML model 160, in turn, includes an SOP synchronization module 162, recommendation module 164, SOP discrepancy report 166, emergency response module 168 for implementing a response to an emergency situation, and training module 170.

In the preferred embodiment, the natural language processor 140 is configured to process the audio from the microphone 120 as well as image data from the camera. In particular, the natural language processor 140 receives audio data with speech from the pilots, parses the audio into phonemes or other type of audio unit, identifies the individual words spoken by the pilot, uses a word graph to represent the spoken sentences in an N-dimensional space, and discerns the subject matter of the spoken sentences. If the pilot's speech uses the words "altitude", "descent", and "landing gear", for example, the natural language processor 140 can deduce that pilot is referring to one or more individual SOP procedures that precede or otherwise pertain to the preparation for and the landing of an aircraft. Aircraft gauges and controls may be also be used to detect preparation for landing or used in combination with the speech to detect preparations for landing.

The word content and subject matter of the spoken sentences is then passed to the keyword matching processor 150 which is configured to compare and match the subject matter uttered by the pilot and identify the most pertinent SOP. If multiple potentially relevant SOPs are identified, the keyword matching processor 150 goes onto to resolve the most relevant SOP based on a weight linear combination, for example, applied to the individual words or their synonyms. In addition, the keyword matching processor 150 may also match the specific operations of the most relevant SOP (in addition to the particular SOP manual) with the actions of the pilot, thereby resolving the specific step being executed by the pilot at that moment.

The artificial intelligence/machine learning (AI/ML) model 160, in the preferred embodiment, includes a generative large language model (LLM) configured to learn flight operations, learn flight crew speech patterns and behaviors, learn remediation measures, and generate a list of actions to take to guide pilots through the SOPs and, in extreme circumstance, intervene in flight operations.

In the course of normal operations, the SOP synchronization module 162 is configured to synchronize the pilot activity with the appropriate SOP. When the pilot is executing the SOP identified by the keyword matching processor 150, the synchronization module 162 follows the specific step-by-step operations executed by the pilot in parallel with the sequence of steps identified in the SOP. If the pilot executes the proper actions in a timely manner, as prescribed by the applicable SOP, then the RTS-FOQA system 130 takes no action. If, however, the pilot fails to take a particular action, fails to take the action at the appropriate time, or deviates from the applicable SOP, then the RTS-FOQA system 130 can execute one or more responses in order to address or rectify the situation. The appropriate response is determined by the recommendation module 164.

A sequence of SOP operational steps may include a series of actions to be executed in a predetermined order and in response to predetermined conditions. For example, a landing sequence may include the steps of (a) adjust airspeed and/or the angle of the wings to decrease lift and begin the descent a predetermined number of miles from the airport, (b) lining up the aircraft with the airport and runway at a predetermined distance from the airport or at a predetermined elevation, (c) lower flaps for low speed approach at a predetermined distance from the airport, (d) lower the landing gear at a predetermined distance from the airport, (e) touch down on the runway, (f) reverse thrust from the engines after touchdown, and (g) apply brakes to slow down the aircraft while taxiing through the airport.

When the pilot is following the applicable SOP, the SOP synchronization module 162 detects when the pilot executes the action prescribed in the applicable SOP. The SOP synchronization module 162 may detect such actions based on audio and/or visual data collected from the cockpit, from flight controls or dashboard gauges and settings, or from the flight deck computer. Similarly, the SOP synchronization module 162 is configured to detect when the pilot fails to execute the prescribed action if and when the pilot deviates from the SOP. A deviation may take various form including: (a) omitting a necessary SOP operational step, (b) executing a step different than the SOP operational step required, (c) executing the proper SOP operational step but out of the order prescribed by the SOPs, and (d) executing the proper SOP operational step prematurely or too late.

The recommendation module 164 is configured to determine the appropriate response if and when the pilot deviates from the SOP sequence. In general, the recommendation module can execute one of three categories of responses. First, if the deviation is relatively minor and does not affect safety, for example, the recommendation module 164 may simply announce via a speaker and/or headphones 180 the SOP operational step omitted and/or incorrectly executed by the pilot. In the preferred embodiment, the recommendation module 164 recites the whole or partial operation to be executed by the pilot. This serves to remind the pilot to execute the appropriate procedure, and to reinforce learning of the procedure for future flights.

Second, in addition to reciting the operational step to be executed by the pilot, the recommendation module 164 may document the deviation in an SOP discrepancy report 166 so that it may be reviewed at a later date. An entry in the SOP discrepancy report 166 enables the deviation to be addressed in subsequent procedures practice, test, simulator, flight, and/or other training events performed by the same pilot, as well as with the completion of courseware updates initiated and completed by the training model 170. And if the particular operation is omitted by a relatively significant number of pilots, for example, the RTS-FOQA system 130 is trained to watch for the deviation more carefully, to announce the proper procedure or an alert/reminder for the proper procedure earlier, or even recommend updates to the SOP and/or other documents to mitigate against omissions and/or mistakes.

Third, if a deviation is significant and affects safety, for example, the recommendation module 164 may activate an emergency response via the emergency response module 168. The emergency response may take one of a number of actions including taking evasive maneuvers including causing the aircraft to climb, to descend, or turn to a specific heading, and/or commence a descent, arrival, and approach for landing. In some extreme situations, the emergency response module 168 may activate the autopilot 190, and/or lock out control inputs from the crew in order to safely maneuver and land the aircraft, for example. The autopilot 190 would then maintain control of the aircraft until it has landed or was otherwise out of danger. In some embodiments, the aircraft control can be taken over and remotely-piloted by a pilot on the ground, for example, instead of employing an autonomous autopilot alone. In yet another embodiment, the flight crew may be locked out of the aircraft flight control system while the cognizant FAA air traffic controller and/or the parent airline determine that all is safe and appropriate to return the flight controls and pilot in command (PIC) duties to the captain and/or first officer.

In the preferred embodiment, the AI/ML module 160 further includes a training module 170 configured to train various components in the machine learning module 160 with past speech-enabled adaptive courseware data and feedback. The speech-enabled adaptive courseware data may include cockpit audio, video, and/or other data from previous flights, or specific training, for example, using select ML and/or human instructor inputs with or without back propagation as necessary to alter and/or enhance the training provided by the system, the classification of keywords detected by the keyword matching procedures, etc. Feedback may take the form of specific audio feedback for tactics, techniques, procedures, other actions, and/or remedial measures to invoke if and when a pilot omits a step or makes a mistake regarding a procedural step prescribed in an SOP manual and/or other cognizant document.

Figure 2:
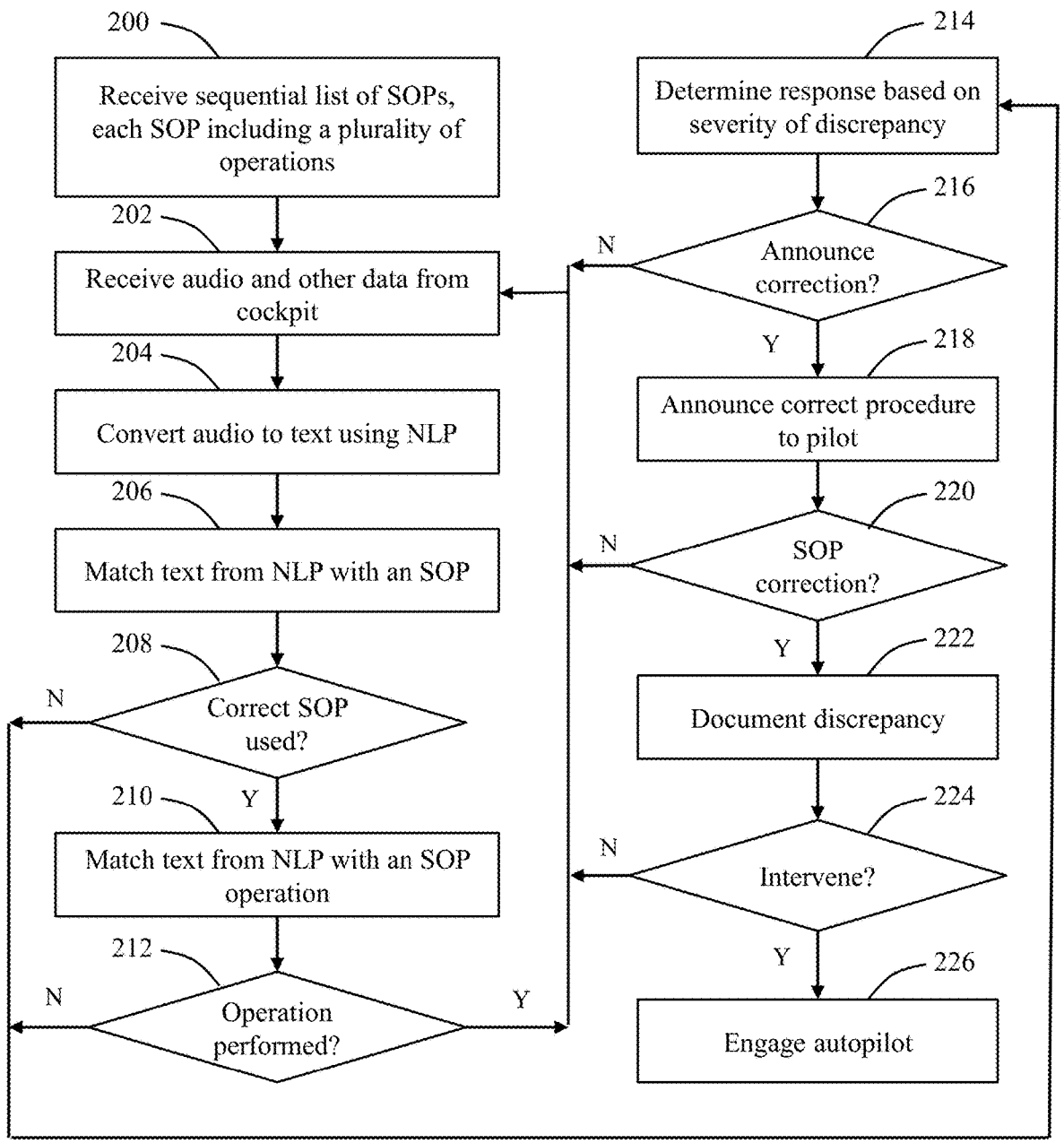
FIG. 2 is a flowchart of the process of implementing speech-enabled adaptive courseware and flight operations quality assurance, in accordance with a preferred embodiment of the present invention.

Illustrated in FIG. 2 is a flowchart of the process of implementing real-time speech-enabled adaptive courseware and flight operations quality assurance (RTS-FOQA), in accordance with a preferred embodiment of the present invention. At the start, the RTS-FOQA system 130 is provided 200 with one or more SOP manuals applicable to the aircraft or airport, for example. During operation of the aircraft, the RTS-FOQA system receives 202 audio and/or video data from the cockpit. The natural language processor then identifies 204 specific words and/or phrases in the audio/video data, and converts those words/phrases to text.

The matching processor then matches 206 the words extracted from the audio data with the words of the SOP manuals to identify which SOP sequence the pilot is implementing at a given moment as well as the specific operational step within the SOP. If the pilot is implementing the proper SOP sequence for the situation, decision block 208 is answered in the affirmative. If the pilot is also implementing the proper SOP operational step within the SOP sequence, decision block 210 is answered in the affirmative. If both decision blocks are affirmative, then the RTS-FOQA system continues the current course of action and continues to take in cockpit audio data and control data for analysis.

If the pilot is executing a step in a manner that is improper or inconsistent with the SOP sequence or SOP operational step, decision block 208 or decision block 210 may be answered in the negative. When answered in the negative, the RTS-FOQA system goes on to determine 214 the nature and severity of the deviation as well as the appropriate response.

If and when the pilot deviates from an SOP sequence and/or other manual, decision block 216 is answered in the affirmative and the RTS-FOQA system proceeds to announce 218 the appropriate incorrect operation step to the pilot via the speaker or headset 180, or via cockpit display (not shown).

If the deviation is important and requires subsequent follow-up, decision block 220 is answered in the affirmative and the RTS-FOQA system proceeds to document the deviation 222 in a report used subsequently to improve pilot training and/or refine the training of the RTS-FOQA system itself, for example.

If the deviation is significant and involves significant risk to the pilot, passengers, and/or the aircraft, for example, decision block 224 is answered in the affirmative and the RTS-FOQA system configured to take control 226 of the aircraft in order to execute corrective maneuvers, or simply engage the autopilot with appropriate and safe maneuvers until the plane has safely landed, for example.

Figure 3:
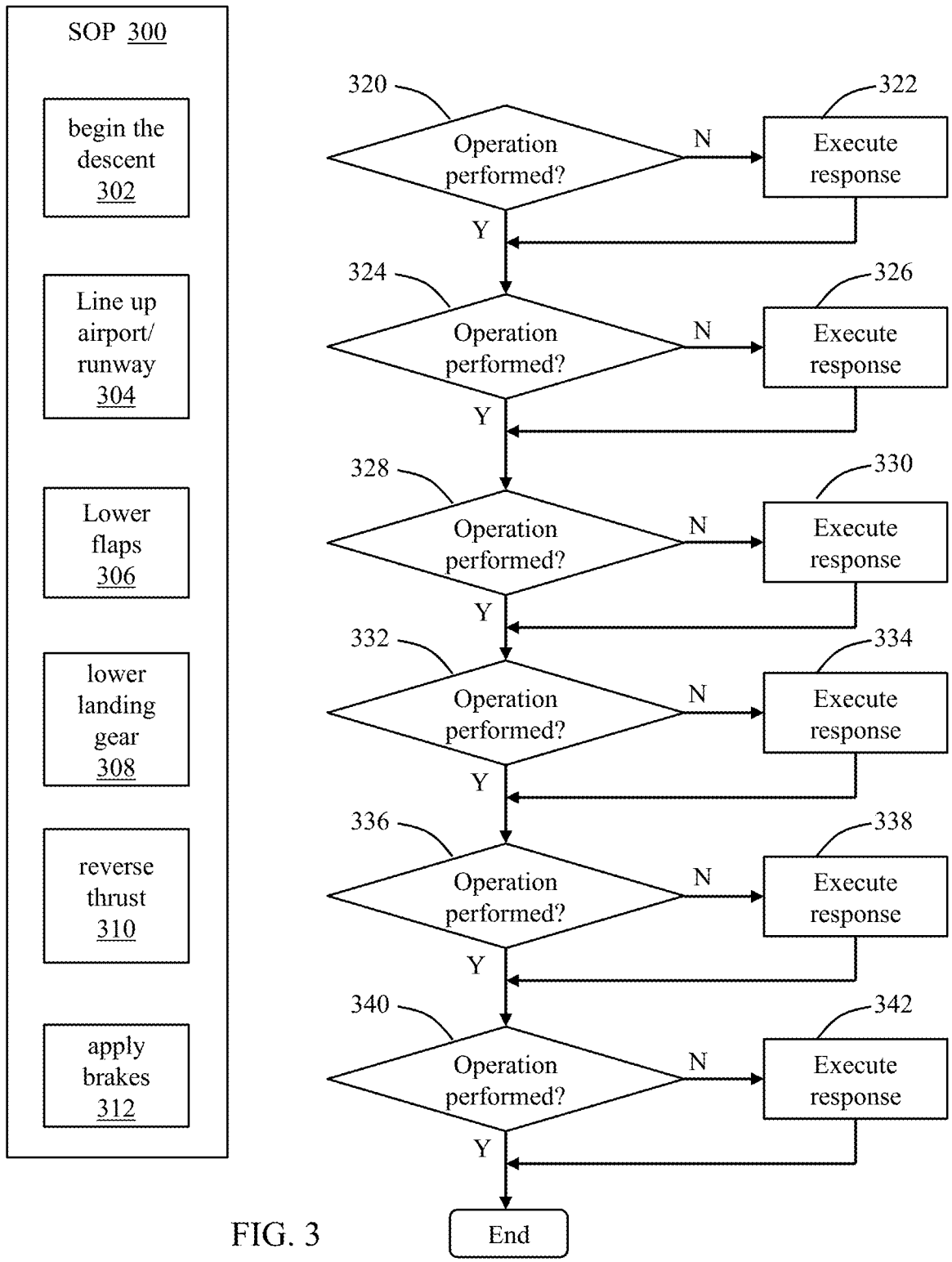
FIG. 3 is a flowchart of the process of implementing flight operations quality assurance during landing, in accordance with a preferred embodiment of the present invention.

Illustrated in FIG. 3 is a flowchart of the process of implementing flight operations quality assurance during landing. To the left is an SOP sequence prescribing operational steps required to properly land the aircraft. The SOP landing sequence may be unique to the aircraft and aircraft configuration, including weight and cargo, for example. In this example, the SOP landing sequence 300 prescribes a plurality of SOP operations or actions: (a) adjust airspeed and/or the angle of the wings to decrease lift and begin the descent 302 when the aircraft is a predetermined number of miles from the airport, (b) lining up 304 the aircraft with the airport and runway at a predetermined distance from the airport or at a predetermined elevation, (c) lower flaps 306 for low speed approach at a predetermined distance from the airport, (d) lower the landing gear 308 at a predetermined distance from the airport, (e) reverse engine thrust 310 after touching down on runway, and (f) apply brakes 312 to slow down the aircraft in order to taxi to a terminal.

To the right of the SOP landing sequence 300 is a flowchart of the decisions/actions executed by the RTS-FOQA system. Assuming that the proper SOP landing sequence has been identified, the SOP synchronization module 162 determines if the pilot initiated the descent at the appropriate distance from the airport. Descent may be determined from the speech spoken by the pilot, by the airspeed indicator as measured by the aircraft instrumentation, or the flight deck computer. If and when the descent is confirmed, decision block 320 is answered in the affirmative. If descent is not detected, or detected late, decision block 320 is answered in the negative and the appropriate response 322 determined by the recommendation module 164. If the pilot begins the descent but late, an appropriate response may be to alert the pilot and/or log the deviation in the SOP discrepancy report 166.

Once engaged in the descent, the SOP synchronization module 162 determines if and when the pilot has aligned to the aircraft for approach to the airport and, specifically, placed the aircraft on a trajectory for landing on the appropriate runway. If and when the trajectory is confirmed, decision block 324 is answered in the affirmative. If the trajectory is not detected, or initiated late, decision block 326 is answered in the negative and the appropriate response 322 determined by the recommendation module 164. As before, if the pilot properly maneuvers the aircraft but not in a timely manner, an appropriate response may be to alert the pilot and/or log the deviation in the SOP discrepancy report 166.

Once the aircraft is on the proper trajectory, the SOP synchronization module 162 determines if the pilot has lowered the flaps at the appropriate altitude or distance from the airport. If and when the flaps are confirmed, decision block 328 is answered in the affirmative. If flaps are not detected, or detected late, decision block 328 is answered in the negative and the appropriate response 330 determined by the recommendation module 164. If the flaps are not engaged, an appropriate response may be to alert the pilot of the need to lower the flaps, log the deviation in the SOP discrepancy report 166, and/or instruct the pilot to abort the landing and try again.

Once the flaps are lowered, the SOP synchronization module 162 determines if the pilot has lowered the landing gear at the appropriate altitude or distance from the airport. If and when the wheels are confirmed to have been lowered in a timely manner, decision block 332 is answered in the affirmative. If the landing gear is not deployed, or deployed late, decision block 332 is answered in the negative and the appropriate response 334 determined by the recommendation module 164. If the landing gear is not deployed at the proper time, an appropriate response may be to alert the pilot of the need to lower the gear, log the deviation in the SOP discrepancy report 166, and/or instruct the pilot to abort the landing and try again.

Once the landing gear is lowered, the SOP synchronization module 162 determines if and when the pilot has touched down on the airport runway and reversed the engine thrust to slow down the aircraft. If the engine thrust is confirmed, decision block 336 is answered in the affirmative. If the pilot fails to reverse the engine thrust, or executes the operation late, decision block 336 is answered in the negative and the appropriate response 338 determined by the recommendation module 164. An appropriate response may be to alert the pilot of the need to reverse engine thrust, log the deviation in the SOP discrepancy report 166. In extreme situations, the recommendation module 164 may automatically reverse the engine thrust to prevent the aircraft from exceeding the length of the runway.

Once the engine thrust is reversed, the SOP synchronization module 162 determines if and when the pilot must apply the brakes to slow down the aircraft. If the application of the brakes is confirmed, decision block 340 is answered in the affirmative. If the pilot fails to apply the brakes, or executes the braking operation late, decision block 340 is answered in the negative and the appropriate response 342 determined by the recommendation module 164. An appropriate response may be to alert the pilot if the need to reverse engine thrust, log the deviation in the SOP discrepancy report 166. In extreme situations, the recommendation module 164 may automatically apply the brakes to prevent the aircraft from exceeding the length of the runway.

In a second embodiment of the present invention, the RTS-FOQA system 130 is configured to capture pilot performance data during personal practice sessions. During a personal practice session, the RTS-FOQA system 130 is configured to (a) collect data with which to evaluate the effectiveness of the pilot as well as the courseware itself, (b) compile/aggregate courseware effectiveness data in a relational database for automated online analytical processing (OLAP), and (c) label/annotate the courseware effectiveness database and OLAP reports based on the standard operational procedure (SOP) and/or courseware area. Thereafter, the RTS-FOQA system 130 may transmit reports regarding the effectiveness to a specific cognizant company or entity with oversight responsibilities. The company/entity may take the form of an airline, individual person, Federal Aviation Administration (FAA), Dept. of Transportation, National Aeronautics and Space Administration (NASA), for example.

In some other embodiments, the system 130 is configured to evaluate the effectiveness of an actor reading and/or learning a script or individual block of memorization items. In this context, the data summarizing the effectiveness with which the actor has learned the script may be transmitted to, for example, a tv/movie producer, studio, or customer. The effectiveness data may also be labeled based on a personal performance specific to each set and/or individual block of memorization items, as well as specific courseware NLP listening, and/or system feedback specific to each set and/or individual block of memorization items.

The AI/ML model in some embodiments is configured to (a) determine multiple operational sequences of user actions that pertain to the operation of an aircraft or other system from training data, (b) interact with pilots to determine whether or not the pilots are properly executing the determined sequences, and (c) take action if the pilots fail to execute the proper operation steps, all using the generative AI/ML model. The training data used to determine the sequences of user actions for operating an aircraft or other system are determined from manuals that recite standard operational procedures (SOPs), documents, audio, video, video displays and other user interfaces, dashboards, gauges, dials, switches, flight simulations, and supervised input, for example.

In some embodiments, the AI/ML model is a generative AI model configured to generate one or more types of content, such as text, imagery, audio, and synthetic data. Various types of generative AI models may be employed, including, but not limited to, large language models (LLMs), generative adversarial networks (GANs), variational autoencoders (VAEs), transformers, etc. Instead of single AI/ML model, some embodiments employ a plurality of AI/ML models to monitor operational sequences. Each AI/ML model may be a deep learning neural network (DLNN) of trained artificial "neurons" that are trained on training data, for example. Typically, the neural network architecture includes an input layer, multiple intermediate layers, and an output layer. In some embodiments, AI/ML models may have multiple layers that perform various functions, such as statistical modeling using a hidden Markov model (HMM), for example, and utilize deep learning techniques such as long short term memory (LSTM) deep learning, and the encoding of previous hidden states to perform the desired operational sequence.

Once the AI/ML model(s) has been trained and deployed in an aircraft, for example, audio and/or video from cockpit is provided as input to the AI/ML model. The AI/ML model processes the audiovisual data for the purpose of identifying the actions of the pilots. The actions of the pilots are compared to the proper SOP sequence of actions for operating the aircraft. If and when a pilot fails to take appropriate action, the AI/ML model may generate an alert to notify the pilot of one or more actions prescribed by the SOP or take over flight of the aircraft in extreme situations.

The AI/ML model may be configured to encode and recognize numerous operational sequences, each sequence including a plurality of actions or steps to be taken by operators in the aircraft, operators on the ground, and other aircraft, for example. Example operational sequences of user actions may include, for example, aircraft boarding sequences, aircraft taxiing sequences, aircraft take-off sequences, aircraft landing sequences, aircraft de-plane sequences.

In some embodiments, the SOP operational steps of an SOP sequence are represented as n-grams of multiple sizes. The n-grams may be used to search for matching sequences in the data, each element of the n-gram being associated with an action to be executed by one or more of the pilots collaborating to achieve a desired result or outcome. In some embodiments, the generative AI/ML model may automatically choose a minimum value for n based on a maximum number of matching sequences. The operational sequence can then be matched with the actions of the aircraft crew to identify the proper SOP sequence, and then compare the crew's actions with that SOP sequence. In certain embodiments, a certain number of matches may be required for a sequence of a certain n-gram size to be considered.

Recurrent neural networks (RNNs) may be particularly adept at determining useful ranges of the values of n. An RNN may determine the optimum windowing threshold (i.e., the useful range of n values) via a trial-and-error process that involves a sweep of n-grams of varying sizes for useful sequences, and potentially a sweep of all sequence sizes in some embodiments. The RNN can then determine the most optimal range, potentially without human input. To extract SOP sequences from training data, n-grams may be applied using a sliding window. For instance, if the current value of n is 15, the first 15 interactions by a user may be compared to all time-ordered sequences of 15 interactions from other operators, then interactions 12-16, 13-17, 14-18, etc. may be compared until all time ordered sets of the user's interactions of that size have been compared to those of other users being considered.

Some SOP sequences of actions can be configured to accomplish the same task with slightly differ procedures. In order to identify that such sequences are functionally the same, some embodiments generate a probability graph that includes loose associations of actions and outcomes. Each possible or observed interaction, or a subset thereof, may be included as a node in the graph. The generative AI/ML model may calculate the probability that a user would hop from one node to another (i.e., the probability that a user would follow an edge between nodes). Edges may provide probabilities between nodes, and potentially of a sequence of nodes as a series of segments therebetween. Such a sequence and its edges may provide a collective probability of starting at one node and arriving at another node via the sequence.

In some embodiments, the generative AI/ML model may be configured to automatically complete new SOP sequences based on observing example sequences in the training data. For example, if the AI/ML model encodes the operational sequence to taxi an aircraft to a particular runway of a particular airport, the generative AI/ML model may be configured to generate a procedure for taxiing any aircraft to the same or similar runway at the same airport based on the original operational sequence. The generative AI/ML model could be a deep learning neural network (DLNN)-trained, generative adversarial network (GAN)-trained, a combination thereof, etc.

In some embodiments, the generative AI/ML model may be trained to recognize desirable outcomes and to determine an SOP sequence or other operation sequence that leads to those desirable outcomes. The generative AI/ML model may, for example, be trained to recognize when an aircraft is in a dangerous situation and the actions that successfully minimized the danger or actions that avoided the dangerous situation all together. To do so, the generative AI/ML model may be configured to look backward in the training data pertaining to the pilot actions to recreate the sequence that led to the desirable outcome. The generative AI/ML model or another process could then associate the interactions with activities and generate an operational sequence that executes the SOP procedure.

In some embodiments, backpropagation may be used for training the AI/ML model. Backpropagation is a technique for optimizing synaptic weights in a feedforward artificial neural network. That is, backpropagation is used to adjust synaptic weights between nodes of the network as well as the bias associated with the nodes in order to minimize the difference between the predicted outputs and the actual outputs in the training dataset. This allows for strengthening of the nodes that lead to a desirable outcome. The weights associated with the nodes that lead to the desirable outcome may be iteratively strengthened until the desirable outcome can be reproduced.

Backpropagation may be guided by a cost function, such as mean square error (MSE) or gradient descent, that measures the similarity between the input training data and the output generated by the LLM. If the cost function is small, only small changes may be required to the link weights connecting nodes of the AI/ML model. If the cost function is large, the link weights of nodes that contributed to the cost may be further reduced to minimize their impact on the output.

In some embodiments, the invention further includes an assistant chatbot to enable pilots to maintain a dialog with the AI/ML model. The dialog may, in turn, be used by the pilots to query the AI/ML model as to the nature of the SOP sequence to be applied, the nature of any deviation from the operational sequence, and possible remedies to cure the deviation. The chatbot may employ on a natural language processor (NLP) such as word2vec, BERT, GPT-3, ChatGPT, or other LLMs to enable the AI/ML model to possess a semantic understanding of the (a) SOP's on which the system is trained, (b) the verbal utterances spoken by pilots in the aircraft, for example, and (c) provide human-like instructions to the pilots when they deviate from the applicable SOP.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, servers, general purpose computers, special purpose computers, application-specific integrated circuit (ASIC), and digital/analog electronic circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A real-time, speech-enabled flight operations quality assurance (RTS-FOQA) system comprising:
   one or more processors;
   at least one microphone;
   at least one video camera;
   a speaker;
   exceedance alert display; and
   an artificial intelligence/machine learning (AI/ML) model implemented by the one or more processors configured to encode a plurality of safety procedures, wherein the AI/ML model is configured to:
   a) receive:
     i) cockpit voice data via the at least one microphone; and
     ii) cockpit video from the at least one video camera;
   b) identify a plurality of flight operations executed by a pilot based on the cockpit voice data and cockpit video;
   c) identify one of the plurality of safety procedures based on the one or more identified operations, wherein the identified safety procedure comprises a plurality of operational steps represented as n-grams, wherein each element of the n-gram is associated with an action to be executed by the pilot, and the AI/ML model automatically chooses a minimum size of the n-gram based on a maximum number of matching sequence between the plurality of flight operations and the plurality of operational steps of the plurality of safety procedures;
   d) determine if the pilot fails to execute any of the plurality of operational steps prescribed by the identified safety procedure;
   e) alert the pilot via the speaker or exceedance alert display if and when the pilot fails to execute any of the plurality of operational steps prescribed by the identified safety procedure.

2. The RTS-FOQA system of claim 1, wherein the safety procedure comprises a standard operational procedure (SOP) sequence, and the plurality of operational steps are SOP operational steps.

3. The RTS-FOQA system of claim 2, further comprising:
   a natural language processor implemented by the one or more processors configured to:
   a) recognize words spoken by the pilot;
   b) convert the recognized words into text.

4. The RTS-FOQA system of claim 3, further comprising:
   a keyword matching processor implemented by the one or more processors configured to:
   a) compare the text derived from the words spoken by the pilot to the SOP sequence;
   b) identify at least one of the plurality of flight operations executed by the pilot;
   c) identify at least one of the plurality of SOP operational steps not executed by the pilot; and
   d) alert the pilot if and when the pilot fails to execute any of the plurality of SOP operational steps.

5. The plurality of safety procedures of claim 3, wherein the plurality of safety procedures are configuration managed (CM) to include updates, revisions, additions, and deletions of procedures.

6. The plurality of safety procedures of claim 3, wherein the plurality of safety procedures are configuration managed (CM) to include updates, revisions, additions, and deletions of procedures.

7. The RTS-FOQA system of claim 3, further comprising a pilot training module, implemented by the one or more processors, configured to compare actual pilot performance to an adaptively encoded plurality of SOPs in the AI/ML model to:
   provide feedback to the pilot on the actual pilot performance and a courseware effectiveness.

8. The RTS-FOQA system of claim 4, wherein the keyword matching processor is further configured to:
   select the SOP sequence from a plurality of SOPs encoded in the AI/ML model based on the text derived from the words spoken by the pilot.

9. The RTS-FOQA system of claim 4, wherein the keyword matching processor is configured to:
   identify at least one of the plurality of SOP operational steps not appropriately and procedurally correctly executed by the pilot; and
   alert the pilot if and when the pilot fails to correctly execute any of the plurality of SOP operational steps in an appropriate and procedurally correct manner.

10. The RTS-FOQA system of claim 8, further comprising:
   a recommendation module implemented by the one or more processors configured identify one or more redial measures to execute if and when the pilot fails to execute any of the plurality of SOP operational steps;

wherein the one or more remedial measures are selected from the group consisting of:
a) generating a record in an SOP discrepancy report, the record identifying the SOP operational step not executed by the pilot;
b) automatically executing an emergency response;
c) automatically executing an evasive maneuver; and
d) automatically implementing an autopilot.

11. The RTS-FOQA system of claim 10, further comprising:
a training module, implemented by the one or more processors, configured to encode the plurality of SOPs in the AI/ML model.

12. The RTS-FOQA system of claim 1, wherein the plurality of safety procedures includes normal and emergency procedures personnel utilize during flight operations.

13. The RTS-FOQA system of claim 1, wherein the plurality of safety procedures include normal and emergency procedures applicable to flight operations.

14. The RTS-FOQA system of claim 1, wherein the speaker comprises at least one headphone.

15. A method of executing flight operations quality assurance (FOQA) protocols with one or more real-time, speech-enabled flight operations quality assurance (RTS-FOQA) systems, the method comprising the steps of:
recognizing words spoken by a pilot;
determining actions taken by the pilot;
converting the recognized words into text;
comparing the text derived from the words spoken and the actions taken by the pilot to a plurality of standard operating procedures (SOPs) encoded by an artificial intelligence/machine learning (AI/ML) model, wherein each of the plurality of SOPs comprises a plurality of SOP operational steps;
identifying one SOP of the plurality of SOPs executed by the pilot based on the words spoken by the pilot and the actions taken by the pilot, wherein the SOP operational steps are represented as n-grams, wherein each element of the n-gram is associated with an action to be executed by the pilot, and the AI/ML model automatically chooses a minimum size of the n-gram based on a maximum number of matching sequence between a plurality of flight operations derived from the words and the actions and the plurality of SOP operational steps;
identifying, based on the AI/ML model, at least one of the plurality of SOP operational steps prescribed by the identified SOP but not executed by the pilot; and
alerting the pilot if and when the pilot fails to execute any of the plurality of SOP operational steps prescribed by the identified SOP.

16. The method of claim 15, further comprising:
identifying one or more redial measures to execute if and when the pilot fails to execute any of the plurality of SOP operational steps;
wherein the one or more remedial measures are selected from the group consisting of:
a) generating a record in an SOP discrepancy report, the record identifying the SOP operational step not executed by the pilot;
b) automatically executing an emergency response;
c) automatically executing an evasive maneuver; and
d) automatically implementing an autopilot.

17. The method of claim 15, wherein the AI/ML model is further configured to synchronize with airline or military SOPs via an application lifecycle management (ALM) system comprising an update/change management system that meets or exceeds the SOP update/change process system requirements for pilots and other personnel.

18. A computer-implemented method, comprising:
providing a generative artificial intelligence/machine learning (AI/ML) model with a plurality of standard operating procedure (SOP) manuals, each SOP manual comprising at least one time-ordered sequence, each sequence comprising a plurality of SOP operational steps;
training the generative AI/ML model to recognize the at least one time-order sequences from the plurality of SOP manuals;
recognizing words spoken by a pilot;
determining actions taken by the pilot;
identifying, based on the generative AI/ML, one SOP of the plurality of SOPs executed by the pilot based on the words spoken by the pilot and the actions taken by the pilot, wherein the SOP operational steps are represented as n-grams, wherein each element of the n-gram is associated with an action to be executed by a pilot, and the AI/ML model automatically chooses a minimum size of the n-gram based on a maximum number of matching sequence between a plurality of flight operations derived from the words and the actions and the plurality of SOP operational steps;
determining, based on the generative AI/ML model, if the pilot fails to execute any of the plurality of associated operational steps prescribed by the identified SOP;
identifying, based on the generative AI/ML model, at least one of the plurality of SOP operational steps of the identified SOP manual that was not executed by the pilot while flying an aircraft; and
alerting, based on the generative AI/ML model, the pilot via the speaker or exceedance alert display if and when the pilot fails to execute any of the plurality of operational steps prescribed by the identified SOP.

* * * * *